Jan. 3, 1967 L. J. BUCHMANN 3,295,549
WATER SOFTENING APPARATUS
Filed Dec. 14, 1964 2 Sheets-Sheet 1
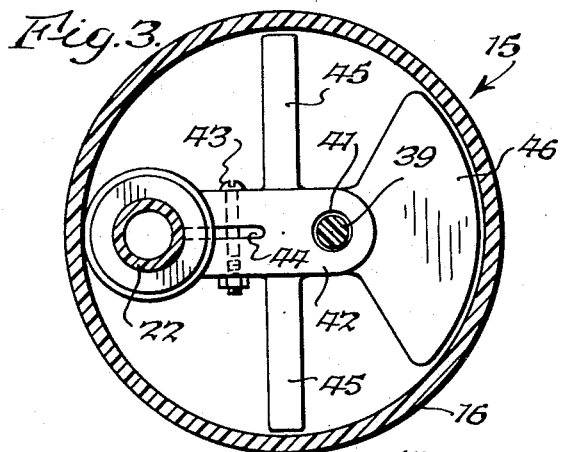
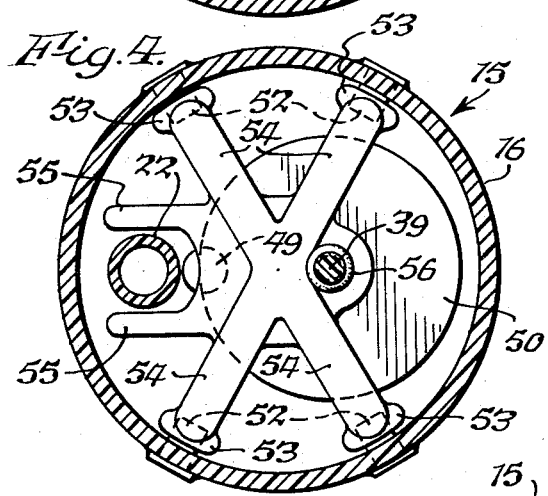
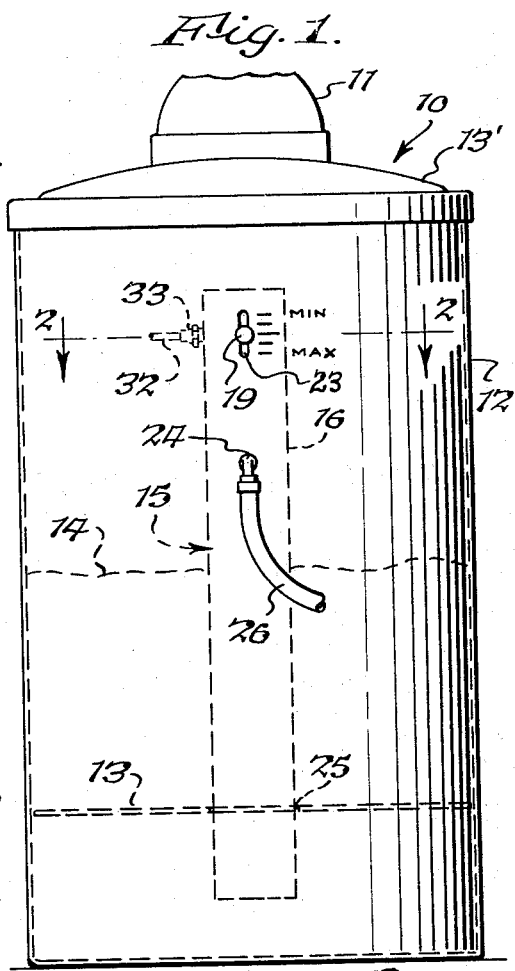
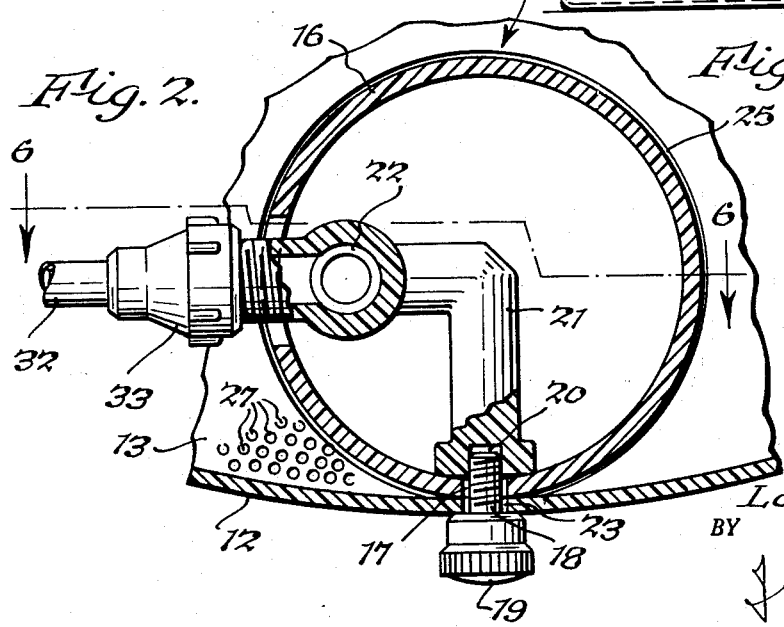
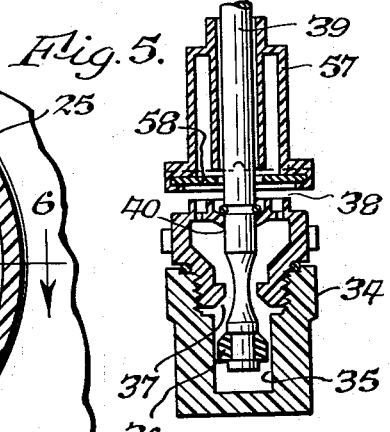
INVENTOR.
Louis J. Buchmann
BY
Joseph P. Gastel
ATTORNEY.

Jan. 3, 1967  L. J. BUCHMANN  3,295,549
WATER SOFTENING APPARATUS
Filed Dec. 14, 1964  2 Sheets-Sheet 2
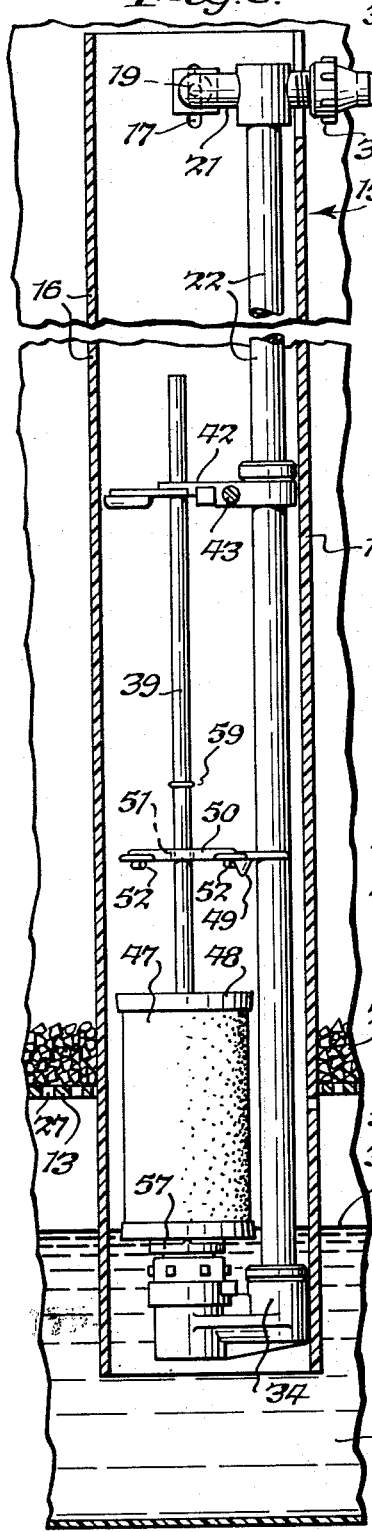
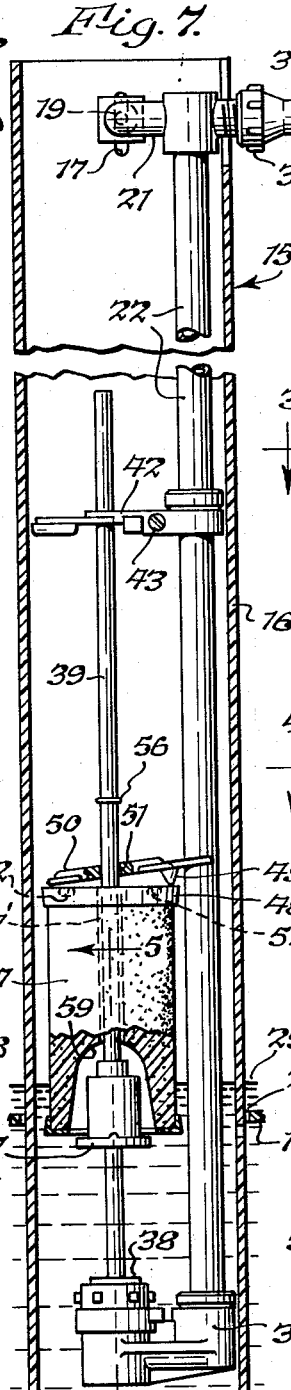
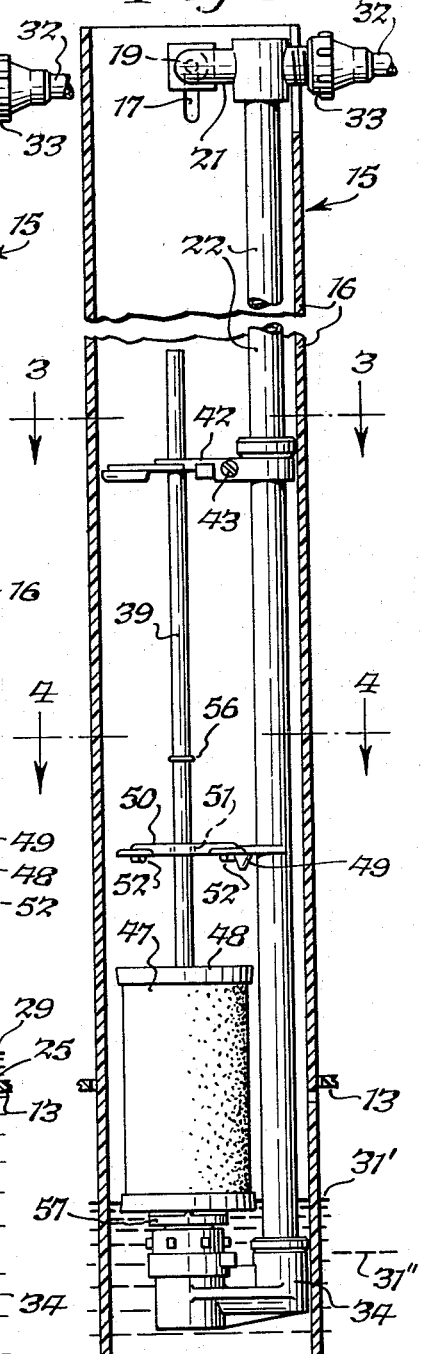
INVENTOR.
Louis J. Buchmann
BY
Joseph P. Gastel
ATTORNEY.

United States Patent Office 3,295,549
Patented Jan. 3, 1967

3,295,549
WATER SOFTENING APPARATUS
Louis J. Buchmann, Buffalo, N.Y., assignor to Aquionics Corporation, Buffalo, N.Y., a corporation of New York
Filed Dec. 14, 1964, Ser. No. 418,178
10 Claims. (Cl. 137—391)

The present invention relates to an improved float valve assembly for terminating liquid flow into a tank when the liquid reaches a predetermined upper level and for terminating flow from the tank when the liquid reaches a lower predetermined level and for permitting adjustment of the lower level at which flow terminates in a simple and expedient manner without affecting the upper level at which flow terminates to thereby vary the amount of liquid which is withdrawn from the tank.

In water softening apparatus of the zeolite type, a brine tank is utilized in which salt pellets are immersed in water to provide a brine solution which is subsequently utilized for regenerating exhausted zeolite. The foregoing is well-known. In the brine tank the salt pellets are supported on a platform and water is admitted below the platform and is caused to wet only a lower portion of the salt on the platform. Thus, the water becomes saturated with salt and it is this saturated brine solution which is subsequently used for regenerating the zeolite.

In the foregoing type of apparatus there are two desirable objectives. The first is to only wet a very small amount of the salt on the platform and secondly, to use only that amount of brine which is required for complete regeneration, and no more. The purpose of both of the foregoing objectives is to conserve salt, and thus eliminate unnecessary cost, and also eliminate the inconvenience of refilling the brine tank with salt pellets more often than should be effected under optimum conditions.

In the past, brine valve arrangements for controlling the upper and lower liquid levels in a brine tank could not achieve the above enumerated objectives in a simple and expedient manner, and therefore greater amounts of salt than were actually necessary to achieve the regeneration function were used. Furthermore, adjustments of previous arrangements to vary the liquid levels in the brine tank were relatively complex and not too accurate. It is with an improved brine valve which overcomes the above enumerated shortcomings in a simple manner that the present invention is concerned.

It is accordingly one object of the present invention to provide an improved brine valve construction for water softening equipment which permits a close control of the amount of brine which is withdrawn from the brine tank in an extremely simple and expedient manner to thereby permit only that amount of brine to be utilized which is necessary for proper regeneration, and no more. A related object of the present invention is to provide a simple control arrangement which permits the adjustment of brine consumption to be made in a simple and expedient manner by the use of a single control which can be used by an average home owner to adjust the amount of brine which is withdrawn for regeneration, to thereby adjust the equipment to meet the water softening requirements in any particular locality.

A further object of the present invention is to provide an improved brine valve assembly for water softening apparatus which is entirely mechanical in operation and is capable of providing long trouble-free operation.

Yet another object of the present invention is to provide a mechanically operated float valve which will terminate flow into a tank when the liquid reaches a predetermined upper level and which will terminate flow from the tank when it reaches a predetermined lower level and which will permit adjustment of the lower level at which liquid is withdrawn in a simple and expedient manner without affecting the upper level at which flow into the tank is terminated. Other objects and attendant advantages of the present invention will readily be perceived hereafter.

Briefly, the present invention relates to a valve assembly designed for water softening apparatus but which may have general usage. In the water softening apparatus salt is placed on a platform in a brine tank, and water, which is admitted to the tank, immerses a lower portion of salt to produce brine. The valve assembly includes a conduit having an opening below the platform for conducting water into the brine tank and for conducting brine from said brine tank. A first valve is provided for terminating the flow of water into the brine tank at a predetermined upper level above the platform. A second valve is provided for terminating flow of brine from said brine tank at a lower predetermined level below the platform. The difference between these two levels determines the amount of brine which is withdrawn. The upper level at which flow of water into the tank is terminated is held constant at a level which is only slightly above the platform. A single, simple adjustment is provided for varying the lower predetermined level at which flow terminates without varying the upper predetermined level to thereby vary the amount of brine which is withdrawn from the tank without varying the amount of salt which is immersed in the water in the tank. Because only a very small amount of the salt on the platform is immersed, and because of the fact that the lower level at which flow from the tank terminates can be adjusted very closely to the upper level, very close regulation of the amount of brine withdrawal can be obtained. Because of this, salt consumption closely approaches that amount which is actually needed for regeneration purposes, and no more. The present invention will be more fully understood when the following portions of the specification are read in conjunction with the accompanying drawings wherein:

FIGURE 1 is a side elevational view of water softening apparatus including a brine tank and the improved brine valve assembly of the present invention;

FIGURE 2 is an enlarged fragmentary cross sectional view taken substantially along line 2—2 of FIGURE 1;

FIGURE 3 is a cross sectional view taken substantially along line 3—3 of FIGURE 8 and showing the guide arrangement for the valve rod;

FIGURE 4 is the cross sectional view taken substantially along line 4—4 of FIGURE 8 and showing the manner in which the transom-lock type of locking arrangement is mounted in the float valve tube;

FIGURE 5 is a view taken substantially along line 5—5 of FIGURE 7 and showing the inlet and outlet valve constructions;

FIGURE 6 is a cross sectional view taken substantially along line 6—6 of FIGURE 2 and showing the position occupied by the float valve assembly when the brine has reached its lowermost level during withdrawal from the tank;

FIGURE 7 is a view similar to FIGURE 6 and showing how the transom-lock type of locking arrangement causes the float to lock itself to the valve stem for shutting off flow of water into the tank; and FIGURE 8 is a view similar to FIGURE 6 but showing the outlet valve from the brine tank in an elevated position for causing less brine to be removed from the tank.

In FIGURE 1, water softening apparatus 10 is shown with certain parts omitted in the interests of clarity. The water softening apparatus is of the zeolite ion exchange type which includes a bed of zeolite (not shown) through which water to be softened is passed. The zeolites are housed in tank 11 which lies in concentric relationship with cylindrical brine tank 12 having cover 13' thereon. Brine tank 12 contains a perforated platform 13 therein on which sodium chloride salt pellets 14 are located. Briefly, water is admitted to a predetermined level in brine tank 12 and the water soaks the lower portion of the brine pellets until it becomes saturated. Thereafter, whenever regeneration is initiated, a suitable valve arrangement, not shown, causes the brine to be passed through the zeolite.

In order to control the amount of water which is admitted to brine tank 12 and in order to control the amount of brine which is withdrawn from brine tank 12, a brine valve assembly 15 is utilized. The brine valve assembly 15 includes a tubular member 16 which prevents salt pellets 14 from interfering with the operation of the elements contained within said tube 16. Tube 16 has a slot 17 (FIGS. 2 and 6) therein through which screw 18 having knob 19 extends. Screw 18 is received in tapped aperture 20 forming a part of support arm 21 for conduit 22 through which water flows into brine tank 12 and through which brine flows out of said tank. An aperture 23 (FIG. 2), is provided in the wall of tank 12 so that the tightening of screw 18 by the turning of knob 19 causes support arm 21 and the inner shoulder of knob 18 to clamp tubular member 16 and the wall of container 12 together to thereby hold conduit 22 in its adjusted position. Aperture 23 is an elongated slot like slot 17. If it is desired to raise or lower conduit 22 in a vertical direction, it is merely necessary to loosen screw 18 and raise or lower it within slots 17 and 23 by manipulating knob 19. To hold such an adjustment it is merely necessary to thereafter retighten said knob 19. The purpose of vertically adjusting the position of conduit 22 is to vary the lower liquid level at which flow from tank 12 will terminate as will become more apparent hereafter.

At this point it will be noted that tubular member 16 is held in its position, during the above noted tightening and loosening of screw 18, by a fitting 24 which extends through an aperture (not shown) in tank 12 and threads into tubular member 16 to thereby effect a clamping engagement between a shoulder (not shown) on fitting 24 bearing on the outside of brine tank 12 and the outside of tubular member 16 bearing on the inside of tank 12. Furthermore, it is to be noted at the present time that platform 13 has a circular cutout portion 25 which receives the bottom end of tubular member 16. Thus, between the cutout portion 25 and the action of fitting 24, tubular member 16 is maintained in a stationary vertical position regardless of the raising and lowering of conduit 22 in the above described manner. Fitting 24 is hollow and is in communication with the inside of tubular member 16 so that in the event, for any reason, the water level within brine tank 12 should reach fitting 24, the water will be conveyed through conduit 26 mounted thereon to a suitable sewer or the like.

As can be seen from FIGURE 1, the salt level 14 is relatively high in brine tank 12, and as also can be seen from FIGURES 1 and 2, the salt is supported on platform 13 which has perforations therein for the purpose of permitting water being discharged from the lower end of conduit 22 to immerse the lower portion of salt supply 14. The maximum water level above platform 13 is shown in FIGURE 7, and this level is only slightly above platform 13. At this point it will be appreciated that it is undesirable to immerse all of the salt because by placing it all in contact with the water it will tend to fuse. Furthermore, it is to be noted that since the combined inlet and outlet for conduit 22 is below the level of platform 13, and since the level drops approximately to the level of the outlet during withdrawal of brine, if the water level above platform 13 is higher than necessary for regeneration, more than the desired amount of brine solution will be taken into the inlet of conduit 22. In addition, the greater the amount of water which is fed to tank 12, the greater will be the amount of salt which is dissolved every time it is immersed. Accordingly, the present arrangement is such that the water level 29 will remain constant irrespective of the varying of the height of the lower portion of conduit 22 to vary the amount of brine which is withdrawn, as will become more apparent hereafter.

At this point, it will be assumed that the brine 30, FIGURE 6, has reached its lower level 31 after it was drawn from tank 12 through conduit 22 by a suitable pump (not shown). The control arrangement (not shown) for the water softening equipment will thereafter cause water to be supplied to conduit 22 through conduit 32, and fitting 33. The water in conduit 22 will pass through fitting 34 (FIGURE 5) and through chamber 35 in fitting 34, past valve 36, and through valve seats 37 and 38 into tank 12. It is to be noted that the valve 36 is mounted on the lower end of rod 39. Rod 39 in turn is guided for vertical movement in aperture 40, proximate valve seat 38, and aperture 41 in guide 42 which is rigidly affixed to conduit 22 by the tightening of nut and bolt 43 straddling slot 44 in member 42. Arms 45 and disk 46 of member 42 are for locating member 42 against excessive cocking or displacement within tube 16.

As water passes upwardly through housing 34 and past valve seats 37 and 38, it will enter brine tank 12, and as the level rises, float 47 will rise also. Float 47 has a longitudinal bore 47' therein which causes it to fit loosely on rod 39 so that it can slide relative thereto. Therefore, as the level of water in tank 12 rises, float 47 will rise without an accompanying movement of rod 39 to thereby permit valve 36 to remain away from its seat 37. However, a point will be reached where upper surface 48 of float 47 will engage downwardly depending projection 49 of locking plate 50.

It will be noted that prior to the time that float top 48 engages lower dependent protuberance 49, rod 39 fits loosely within aperture 51 in plate 50 (FIGURES 6 and 8) while said plate is being held substantially perpendicularly to the axis of rod 39 by resting on four pins 52 extending inwardly from tube 16, said pins underlying ends 53 of legs 54. Whenever protuberance 54 is engaged by the float top 48, it will cock to assume the position shown in FIGURE 7, and the sides of aperture 51 of plate 50 will lock against rod 39 so that continued movement of float 47 upwardly will now result in accompanying upward movement of rod 39 until such time as valve 36 (FIGURE 5) will seat firmly on its seat 37 to thereby terminate the flow of water into tank 12 from conduit 22.

At this point it is to be noted that arms 55 of plate 50 straddle conduit 22 (FIGURE 4) to prevent undesired rotational movement of plate 50 about rod 39. In other words, the relationship between rod 39 and its encircling aperture 51 and relationship between arms 55 and conduit 22 causes plate 50 to be raised or lowered without an accompanying rotation in its plane.

An O-ring 56 is mounted on rod 39 above plate 50 so that if for any reason plate 50 does not cock to the position shown in FIGURE 7 to provide the above described action but moves upwardly, a point will be reached where O-ring 56 is engaged by the side of a plate 50 surrounding aperture 51 to thereby cause rod 39 to rise and cause valve 36 to move up into seating relationship with seat 37 to thereby terminate flow of water out of the end of conduit 22.

As noted above, the water will rise to level 29, FIGURE 7, and will soak only the portion of the salt pellets 28 which are immersed by it. This soaking relationship is maintained all the while that the zeolite of the water softening apparatus is active for the purpose of softening water. However, after a period of time, a control mechanism (not shown) will cause the brine formed as a result of the above-mentioned soaking to be passed through the exhausted zeolite for the purpose of regenerating it. Because of the immersion of the salt pellets 28, a point will be reached where the brine in the tank will become totally saturated and therefore no more salt will dissolve.

Whenever it is required to withdraw brine from tank 12, during regeneration, the valving of the system (not shown) will cause conduit 22 to remove the brine from the tank whereas it previously conducted water to the tank in the above described manner. Therefore, as soon as the withdrawal of liquid through conduit 22 begins, the vacuum created in conduit 22 will cause an unseating of valve 36 from its seat 37 to permit brine to enter conduit 22. Therefore, the level of brine will drop and this will be accompanied by the dropping of float 47 which in turn will also cause rod 39 to move downwardly because of the transom-lock type of connection still existing between rod 39 and float 47. However, a point will be reached where all four pins 52 will engage arms 54 and thus be in supporting relationship with plate 50 and therefore cause alignment between aperture 51 and the axis of rod 39 to thereafter permit relative movement between float 47 and rod 39. The withdrawing of brine from tank 12 will continue until such time as the float valve 57 has its valve portion 58 seated in fluid tight relationship on seat 38 and at this time no more brine will be withdrawn. The upper portion of float 57 fits into bore 59 in float 47 and both move down substantially in unison. It will be appreciated, however, that floats 57 and 47 are separate units. There is a certain amount of looseness between float 57 and float 47 to permit a good firm seating engagement because float 57 can cock somewhat on rod 39.

The foregoing seating relationship between float 57 and seat 38 will be maintained until such time as conduit 22 is again used to conduct water into brine tank 12 in the above described manner at which time the force of water flowing through conduit 22 will force float 57 upwardly from seat 38. At this juncture it is to be noted that valve portion 58 of float 57 is below the surface of the liquid in tank 12 to prevent air from being sucked into conduit 22 through seat 38 when brine is withdrawn from tank 12.

In accordance with the present invention, the amount of brine which is always withdrawn from tank 12 is that amount which lies between upper fixed level 29 (FIGURE 7) and lower variable level 31 (FIGURE 6). More specifically, as noted above, upper level 29 can never be varied or exceeded because of the action which is achieved as a result of the cooperation between float 47 and plate 50. In this respect, tube 16 is fixed relative to the bottom of tank 12 and pins 52 are fixed in tube 16. Thus the transom-lock type of action will always occur a fixed distance above the bottom of brine tank 12. The lower level 31, at which flow of brine from tank 31 terminates, is determined by the seating of float valve 57 on seat 37, as described above.

For different installations it may be desired to either increase or decrease the amount of brine which is utilized for regenerating purposes. It will be appreciated therefore that if the upper level 29 remains constant, by lowering the lower level 31 (FIGURE 6) more brine can be withdrawn from tank 12, and by raising lower level 31 less brine can be withdrawn from tank 12. Both effects can be obtained without in any way varying the level of the water above platform 13.

To adjust the lower level 31 at which flow of brine from tank 12 is terminated, it is merely necessary to vary the level of valve seat 38. To do this it is merely necessary to loosen knob 19 (FIGURE 2) to thereby release the clamping relationship between arm 21 and knob 19 through screw 18. Thereafter, by raising knob 19, screw 18 will move from a central position within slot 17 (FIGURES 6 and 7) to an upper position in slot 17 (FIGURE 8). The entire conduit 22 will move upwardly within tube 16 and so will its lower end mounting valve seat 38. However, as can be seen from FIGURE 4, locking plate 50 will remain at rest on pins 52 so that upward movement of conduit 22 will not be accompanied by any upward movement of locking plate 50. Therefore whenever float 47 moves into engagement with plate 50, the upper level of liquid in brine tank 12 will be determined and because this engagement always occurs at a predetermined fixed upper level, level 29 cannot be varied regardless of varying the position of the lower end of conduit 22.

It will be appreciated that the raising of valve seat 38 to level 31' (FIGURE 8) will cause less brine to be taken into conduit 22 because the difference between upper level 29 and lower level 31 is less than the difference between upper level 29 and lower level 31 (FIGURE 6). Conversely, in the event that it is desired to increase the amount of brine which is taken into conduit 22, it is merely necessary to manipulate knob 19 to cause screw 18 to lie in the lowermost portion of slot 17 to thereby cause the level at which float 57 seats on valve seat 38 to be at level 31" (FIGURE 8). In other words, by lowering seat 38, seating of float valve 57 will not occur until the level of brine has dropped to level 31" (FIGURE 8). In this event more brine will be taken into conduit 22 for regeneration purposes.

It will be appreciated that the more brine that is withdrawn, the more water will be used to fill the tank to its upper level, and, as a result, the more salt will be dissolved. Conversely, the higher the lower level is, the less water will be used for replacement and therefore the less salt will be dissolved. As is well appreciated, different localities have different water hardnesses, and the owner of the equipment, by adjusting the level of knob 19 according to the calibrations on the outside of brine tank 12 (FIGURE 1) can determine the amount of saturated brine which is withdrawn, and therefore adjust the salt consumption to meet his particular requirements. In the foregoing respect, if knob 19 is moved to the "MAX" position in FIGURE 1, the maximum amount of brine will be withdrawn, and if it is moved to the "MIN" position, the minimum amount of brine will be withdrawn. Furthermore, different quantities may be withdrawn by placing knob 19 in various intermediate positions between the "MAX" and "MIN" markings, with the amounts increasing as knob 19 is moved from "MIN" to "MAX."

It will be appreciated that the improved, highly simplified, totally mechanical float arrangement of the present invention is manifestly capable of achieving the above enumerated object and while preferred embodiments of the present invention have been disclosed, it is to be understood that it is not limited thereto but may be otherwise embodied within the scope of the following claims:

1. A brine valve assembly for water softening apparatus comprising a conduit having an opening, a first valve seat in said opening, a vertically extending rod, first valve means on said rod for seating on said first valve seat when said rod moves upwardly and for unseating when said rod moves downwardly, float means mounted for sliding movement on said rod, float supported second valve means slidably mounted on said rod, a second valve seat on said opening of said conduit for receiving said second valve means when the liquid surrounding said lower portion of said conduit drops to a first predetermined lower level, lock means mounted relative to said rod for providing locking engagement between said rod and said float means when said float means rises to a second predetermined upper level which is higher than said first predetermined level to thereby cause said float means and said rod to rise in unison to cause said first valve means to seat on said first valve seat, said lock means including means for permitting said rod to move axially relative thereto during vertical movement of said rod when said float means is below said second predetermined upper level, and means for raising or lowering said first and second valve seats in unison by raising and lowering said conduit without varying the position at which said lock means provides said locking engagement in view of the action of said means for permitting said rod to move axially, to thereby vary the level at which seating occurs between said second valve means and said second seat means without varying the upper level at which seating occurs between said first valve means and said first seat means.

2. A brine valve assembly for water softening apparatus for conducting water to a brine tank in which said brine valve assembly is to be mounted and for conducting brine therefrom comprising a vertically extending conduit having an upper portion and a lower portion, a tubular outer member surrounding said conduit, a combined inlet-outlet on the lower portion of said conduit, said outlet of said combined inlet-outlet comprising a first valve seat on the inside of said combined inlet-outlet and first valve means movable upwardly into engagement therewith to terminate flow of water from said combined inlet-outlet when the water reaches a first predetermined level, said inlet of said combined inlet-outlet comprising a second valve seat mounted on the outside of said combined inlet-outlet in opposition to said first valve seat and second valve means movable downwardly into engagement with said second valve seat to terminate flow of brine into said conduit when the brine drops to a second predetermined level, a rod extending substantially parallel to said conduit and being concentric with said first and second valve seats and rigidly mounting said first valve means and mounting said second valve means, means for causing said second valve means to move upwardly with the level of the water and downwardly with the level of the brine, float means mounted for relative sliding movement on said rod, plate means having an aperture therein for receiving said rod, support means extending inwardly from said tubular outer member for supporting said plate means with said aperture substantially coaxial with the axis of said rod when the water is below said first predetermined level to thereby permit relative movement between said rod and said float means and thereby permit said first valve means to remain out of engagement with said first valve seat, and means for cocking said plate means when said float means reaches said first predetermined level to lock said float means to said rod and thereby move said first valve means into engagement with said first valve seat to terminate the flow of water from said conduit.

3. A brine valve assembly as set forth in claim 2 including means for varying the level of said first and second valve seats by moving said conduit vertically without varying the position of said support means to thereby vary the amount of brine which is withdrawn without varying the said first predetermined level at which flow of water terminates.

4. A brine valve for water softening apparatus comprising a vertically oriented rod having a lower end and an upper end, means for guiding said rod for vertical movement, a float loosely mounted on a central portion of said rod between said lower and upper ends for vertical movement on said rod, a poppet valve mounted on the lower end of said rod, a conduit for conducting liquid to and from a tank in which said brine valve is to be mounted, a first valve seat in said conduit located above said poppet valve for receiving said poppet valve in sealing relationship in response to the raising of said rod by said float, a second valve seat on said conduit located in opposition to said first valve seat and coaxial therewith, a second valve loosely mounted on said rod and adapted to move into seating engagement with said second valve seat as liquid drops to a first predetermined level to thereby terminate flow of liquid into said conduit, a member, an aperture in said member, means for supporting said member at a predetermined fixed elevation between said upper and lower ends of said rod, said means for supporting said member normally causing said aperture to remain substantially coaxial with said rod to thereby permit said rod to move freely relative to said member and means for causing said member to cock when said float rises and effectively engages said member in response to the raising of the level of liquid to a second predetermined level to thereby cause said float and said rod and said member to rise in unison as a result of said aperture in said member and said rod being locked by a transom type locking connection as a result of the cocking of said member and thereby cause said poppet valve mounted on the lower end of said rod to move into engagement with said first valve seat to thereby terminate the flow of liquid from said conduit after said liquid reaches said second predetermined level.

5. A brine valve assembly as set forth in claim 4 including means for varying the elevation of said second valve seat without varying the elevation of said member to thereby adjust the level at which said second valve seats on said second valve seat to thereby change said first level at which flow of liquid into said conduit is terminated without changing the level at which flow of liquid from said conduit at said second predetermined level is terminated.

6. A valve assembly for permitting liquid to flow into a tank to a first predetermined upper level and for permitting liquid to flow out of a tank to a second lower predetermined level comprising conduit means for conducting said liquid, a rod operatively mounted for vertical movement and having a lower and an upper end, first valve means mounted proximate the lower end of said rod for terminating flow from said conduit means when said first valve means are caused to seat on a first valve seat when said liquid reaches said first predetermined upper level, a second valve means operatively mounted relative to said conduit means for terminating flow of liquid when said liquid reaches said second predetermined lower level, float means mounted for relative sliding movement on said rod, a member, means for mounting said member relative to said rod, an aperture in said member being substantially coaxial with the axis of said rod when said means for mounting said member causes it to assume a first position to thereby permit relative movement between said rod and said member, and means for causing said member to cock relative to said rod and assume a second position effectively locking said float means to said rod when said float means reaches a position corresponding to said first predetermined level to thereby cause said rod and said float means to move upwardly in unison and thereby cause said first valve means to seat on said first seat to thereby terminate the flow of liquid out of said conduit means.

7. A valve arrangement for shutting off flow of liquid into a tank when the liquid rises to a predetermined level comprising a vertically extending conduit having an outlet, a valve seat in said conduit, means for varying the level of said valve seat, a poppet valve located below said valve seat, a vertically extending rod in concentric relation with said valve seat and mounting said poppet valve, guide means for guiding said rod in a vertical direction, float means loosely mounted on said rod for movement relative thereto, lock means, and means mounting said lock means at a fixed elevation irrespective of the position of said valve seat for locking said float means to said rod to cause both said float means and said rod to move upwardly in unison when the liquid rises to said predetermined level to thereby terminate flow through said outlet by effecting seating of said poppet valve on said valve seat in response to the combined movement of said rod and said float means in unison resulting from the locking of said float means to said rod by said lock means.

8. A valve arrangement as set forth in said claim 7 wherein said locking means comprises a plate having an aperture therein, means for supporting said plate with said aperture co-axial to said rod to thereby permit free passage of said rod through said aperture, and means on said float means for moving said aperture out of co-axial relationship with said rod to thereby cause the portion of said plate surrounding said aperture to engage said rod in locking relationship when said float means moves said plate to terminate said co-axial relationship between said aperture and said rod, and means for returning said plate to a position where said aperture and said rod are in co-axial relationship when said float means moves out of engagement with said plate in response to the lowering of the level of the liquid.

9. A valve arrangement as set forth in claim 7 including a second valve seat on said conduit in opposition to said first valve seat, second valve means mounted relative to said second valve seat for movement into engagement with said second valve seat when said liquid falls to a second predetermined level, and means for varying the elevation of said second valve seat to thereby vary said second predetermined level whereby said lower predetermined level may be adjusted while said mounting of said lock means at a fixed elevation permits said predetermined level to remain constant irrespective of the position of said second valve seat.

10. A valve arrangement as set for in claim 9 wherein said means for varying the elevation of said second valve seat comprises means for varying the elevation of said vertically extending conduit.

References Cited by the Examiner
UNITED STATES PATENTS 1,103,803  7/1914  Meissner _____ 137—426
3,095,005  6/1963  Thompson _____ 137—391 X M. CARY NELSON, *Primary Examiner.*

MARTIN P. SCHWADRON, *Examiner.*